(12) United States Patent
Kim

(10) Patent No.: US 11,901,595 B2
(45) Date of Patent: Feb. 13, 2024

(54) SYSTEM AND METHOD FOR MEASURING IMPEDANCE OF A FUEL CELL STACK

(71) Applicants: HYUNDAI MOTOR COMPANY, Seoul (KR); KIA CORPORATION, Seoul (KR)

(72) Inventor: Jae Hoon Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 134 days.

(21) Appl. No.: 17/380,793

(22) Filed: Jul. 20, 2021

(65) Prior Publication Data

US 2022/0173417 A1    Jun. 2, 2022

(30) Foreign Application Priority Data

Nov. 30, 2020    (KR) ........................ 10-2020-0164623

(51) Int. Cl.
*H01M 8/04537*    (2016.01)
*B60L 58/40*    (2019.01)
*B60L 58/33*    (2019.01)

(52) U.S. Cl.
CPC ......... *H01M 8/04619* (2013.01); *B60L 58/33* (2019.02); *B60L 58/40* (2019.02); *H01M 8/04559* (2013.01); *H01M 8/04589* (2013.01); *H01M 2250/20* (2013.01)

(58) Field of Classification Search
CPC ......... H01M 8/04619; H01M 8/04559; H01M 8/04589; H01M 2250/20; B60L 58/33
See application file for complete search history.

(56) References Cited

U.S. PATENT DOCUMENTS

| 2017/0250415 A1* | 8/2017 | Koiwa | H02J 7/00 |
| 2020/0144638 A1* | 5/2020 | Mizutani | H01M 8/0494 |
| 2020/0168930 A1* | 5/2020 | Park | B60L 58/40 |

FOREIGN PATENT DOCUMENTS

KR    20170100117 A    9/2017

OTHER PUBLICATIONS

Myoung, KR 1020170100117 A, Espacenet machine translation, 2017 (Year: 2017).*

* cited by examiner

*Primary Examiner* — Adam A Arciero
(74) *Attorney, Agent, or Firm* — Lempia Summerfield Katz LLC

(57) ABSTRACT

A system and a method for measuring impedance of a fuel cell stack are disclosed. The system includes: an energy consumption device, a cooling device, and a high-voltage battery connected in parallel to a main bus end of a fuel cell stack; a relay provided at the main bus end and configured to electrically connect or disconnect the cooling device and the high-voltage battery to or from the fuel cell stack; an impedance measurement unit configured to apply an AC current to the fuel cell stack and to measure the impedance of the fuel cell stack; and a controller configured to turn off the relay during measurement of the impedance of the fuel cell stack.

11 Claims, 4 Drawing Sheets

SYSTEM AND METHOD FOR MEASURING IMPEDANCE OF A FUEL CELL STACK

CROSS REFERENCE TO RELATED APPLICATION

The present application claims priority to Korean Patent Application No. 10-2020-0164623 filed on Nov. 30, 2020, the entire contents of which are incorporated herein for all purposes by this reference.

BACKGROUND

Field of the Disclosure

The present disclosure relates to a system and a method for measuring impedance of a fuel cell stack. The system and method can minimize noise occurring during measurement of impedance of a fuel cell by supplying energy from a battery, rather than the fuel cell, to high-voltage energy consumption parts (e.g., a compressor, a cooling pump, and the like) that cause noise. The system and method can also minimize influence on a driving area of the fuel cell due to smaller energy consumption. The system and method can also measure the impedance of the whole fuel cell stack and the impedance of one or more of cells in certain locations. The system and method can also increase the degree of freedom of design since not only is the existing water cooling applicable, but air cooling is also applicable due to a small amount of heat generation.

Description of the Related Art

Recently, with the abrupt increase in necessity of new renewable energy and green energy, technical demands for a vehicle fuel cell and an industrial fuel cell have increased. Since the fuel cell produces a current through a sensitive chemical reaction of hydrogen and oxygen under variable conditions, a problem of cell deterioration may occur due to operating conditions and environments.

At present, as the direct method for measuring the degree of fuel cell deterioration, a method for directly measuring an impedance of the fuel cell or the whole fuel cell stack is most accurate. However, according to an existing fuel cell system, the impedance measurement is performed such that: the fuel cell stack is caused to be in an energy producing state, i.e., in an open circuit voltage (OCV) state, using a compressor and a hydrogen supply device; an AC-component energy from the fuel cell stack is consumed by an impedance measurement unit; and then the consumed energy at that time is finally consumed by a cathode oxygen depletion (COD) resistor.

In this case, a large amount of heat is generated by the resistor (COD), and thus water-cooling heat exchange by a cooling pump is necessary. Further, in the case of the conventional technology, during the impedance measurement, energy for driving electrical circuits and switching elements, such as the compressor and the cooling pump, is supplied from the fuel cell stack. Thus, a noise component is inevitably exerted on the impedance measurement unit. Accordingly, the accuracy of the impedance measurement is degraded, and a considerable difficulty occurs even in its control.

The foregoing is intended merely to aid in understanding the background of the present disclosure, and is not intended to mean that the present disclosure falls within the purview of the related art that is already known to those having ordinary skill in the art.

SUMMARY

The present disclosure is proposed to solve the above-mentioned problems. An object of the present disclosure is to provide a system and a method for measuring impedance of a fuel cell stack. The system and method can minimize noise occurring during measurement of impedance of a fuel cell by supplying energy from a battery, rather than the fuel cell, to high-voltage energy consumption parts (e.g., a compressor, a cooling pump, and the like) that cause noise. The system and method can also minimize influence on a driving area of the fuel cell due to smaller energy consumption. The system and method can also measure the impedance of the whole fuel cell stack and the impedance of one or more cells in certain locations. The system and method can also increase the degree of freedom of design since not only is the existing water cooling applicable, but air cooling is also applicable due to a small amount of heat generation.

To achieve the above object, a system for measuring impedance of a fuel cell stack according to the present disclosure includes: an energy consumption device, a cooling device, and a high-voltage battery connected in parallel to a main bus end of a fuel cell stack; a relay provided at the main bus end and configured to electrically connect or disconnect the cooling device and the high-voltage battery to or from the fuel cell stack; an impedance measurement unit configured to apply an AC current to the fuel cell stack and to measure the impedance of the fuel cell stack; and a controller configured to turn off the relay during measurement of the impedance of the fuel cell stack.

During the measurement of the impedance of the fuel cell stack, the energy consumption device may consume energy by an AC current component applied to the fuel cell stack.

During the measurement of the impedance of the fuel cell stack, the cooling device may cool the energy consumption device.

During the measurement of the impedance of the fuel cell stack, the cooling device may be provided with energy from the high-voltage battery.

During a general operation of the fuel cell stack, the relay may be turned on, and the cooling device may be supplied with energy from the fuel cell stack and cool the fuel cell stack.

The impedance measurement unit may be provided with a current application line and a voltage measurement line.

The impedance measurement unit may be configured such that a current application line is electrically connected to both ends of the fuel cell stack and a voltage measurement line is electrically connected to both the ends of the fuel cell stack.

The impedance measurement unit may be configured such that a current application line is electrically connected to both ends of the fuel cell stack and a voltage measurement line is electrically connected to a partial cell section of the fuel cell stack.

The impedance measurement unit may be configured such that a current application line is electrically connected to a partial cell section of the fuel cell stack and a voltage measurement line is electrically connected to the partial cell section of the fuel cell stack.

The impedance measurement unit may be configured such that a current application line is electrically connected to a partial cell section of the fuel cell stack and a voltage measurement line is electrically connected to a cell section having a narrower range than that of the current application line.

The controller may turn on the relay and make the fuel cell stack supply energy to the cooling device after the measurement of the impedance of the fuel cell stack has ended.

The energy consumption device may be electronic equipment including a driving motor.

The energy consumption device may be directly connected to the fuel cell stack or the impedance measurement unit separately from the main bus end.

A method for measuring impedance of a fuel cell stack using the measurement system according to the present disclosure includes: turning off a relay; applying, by an impedance measurement unit, an AC current to the fuel cell stack; measuring, by the impedance measurement unit, the impedance of the fuel cell stack; consuming, by an energy consumption device, energy by an AC current component applied to the fuel cell stack; and supplying, by a high-voltage battery, the energy to a cooling device and cooling, by the cooling device, the energy consumption device.

The system and the method for measuring the impedance of the fuel cell stack according to the present disclosure can minimize noise occurring during the measurement of impedance of the fuel cell by supplying the energy from the battery, rather than the fuel cell, to the high-voltage energy consumption parts (e.g., a compressor, a cooling pump, and the like) that cause noise. The system and method can also minimize the influence on the driving area of the fuel cell due to the smaller energy consumption. The system and method can also measure the impedance of the whole fuel cell stack and the impedance of one or more cells in the certain locations. The system and method can also increase the degree of freedom of design since not only is the existing water cooling applicable, but air cooling is also applicable due to the small amount of heat generation.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF EMBODIMENTS

Figure 1:
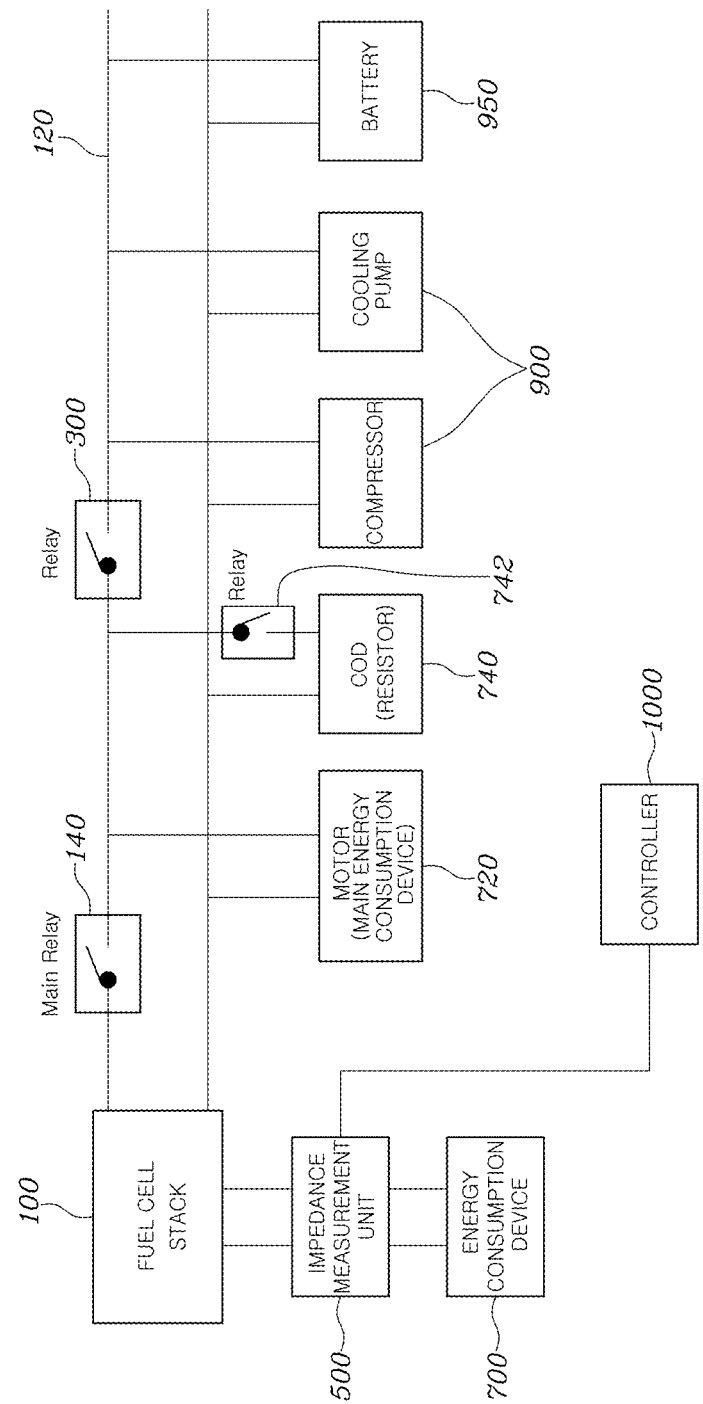
FIG. 1 is a diagram illustrating the configuration of a system for measuring impedance of a fuel cell stack according to an embodiment of the present disclosure.
Figure 2:
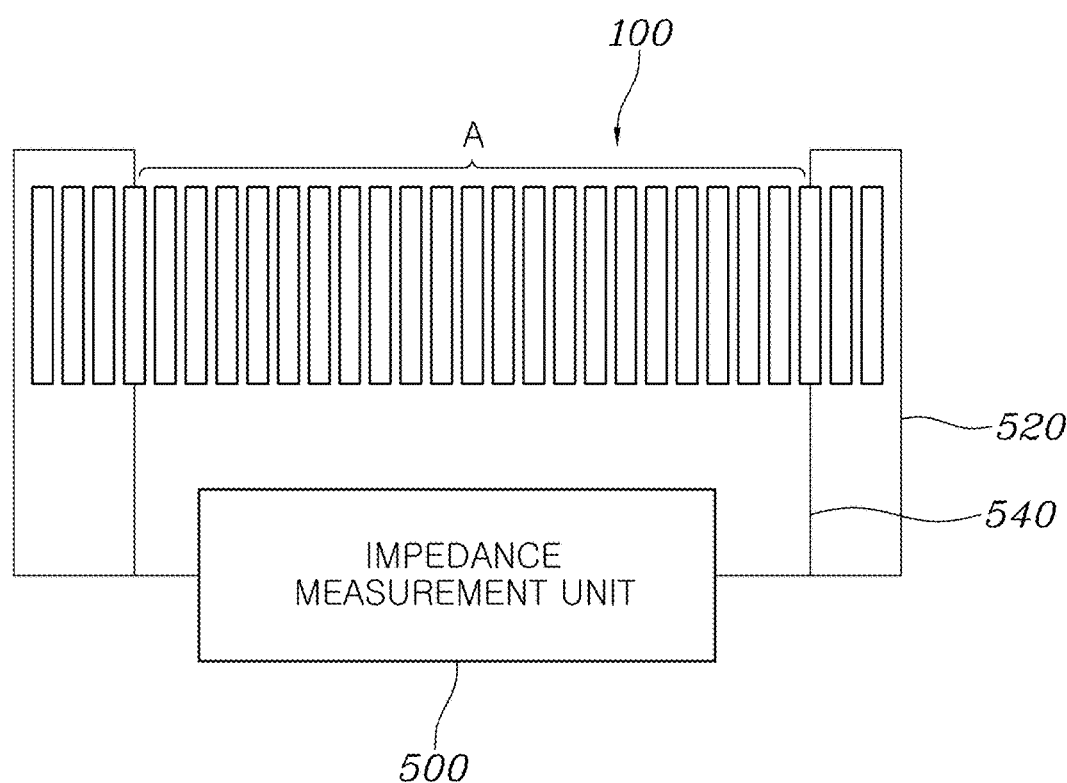
FIGS. 2 and 3 are diagrams illustrating a connection state of an impedance measurement unit of the system for measuring impedance of a fuel cell stack according to an embodiment of the present disclosure.
Figure 3:
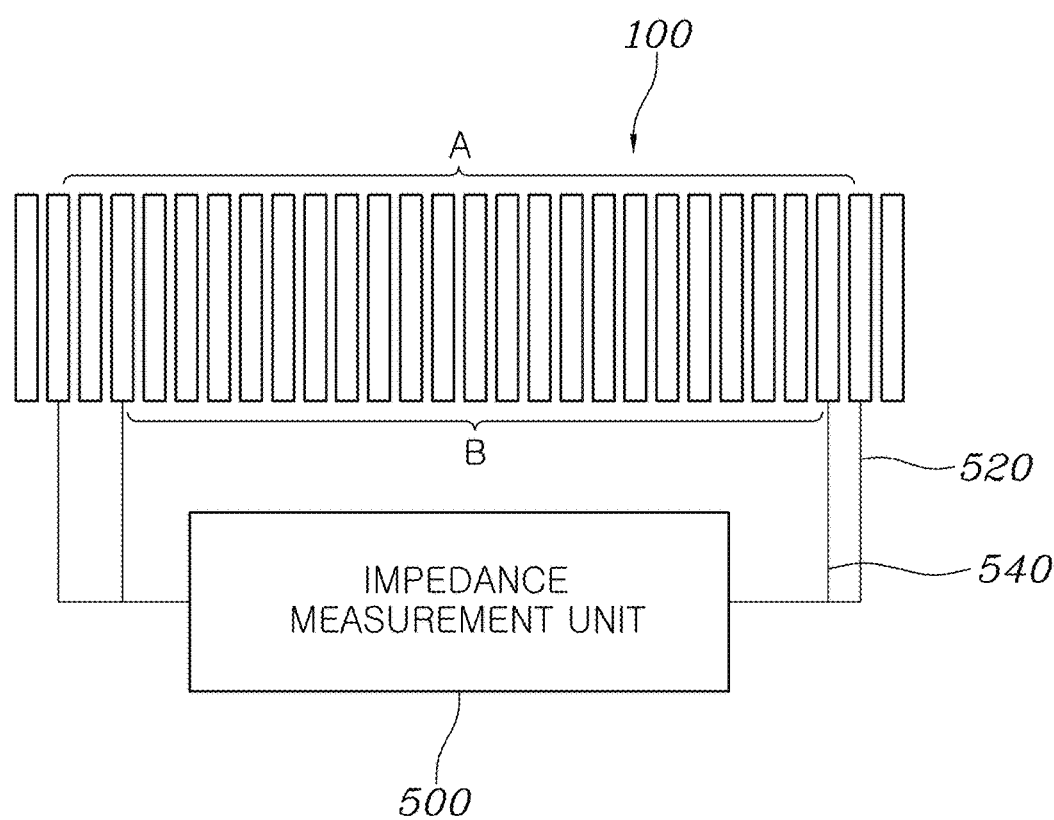
Figure 4:
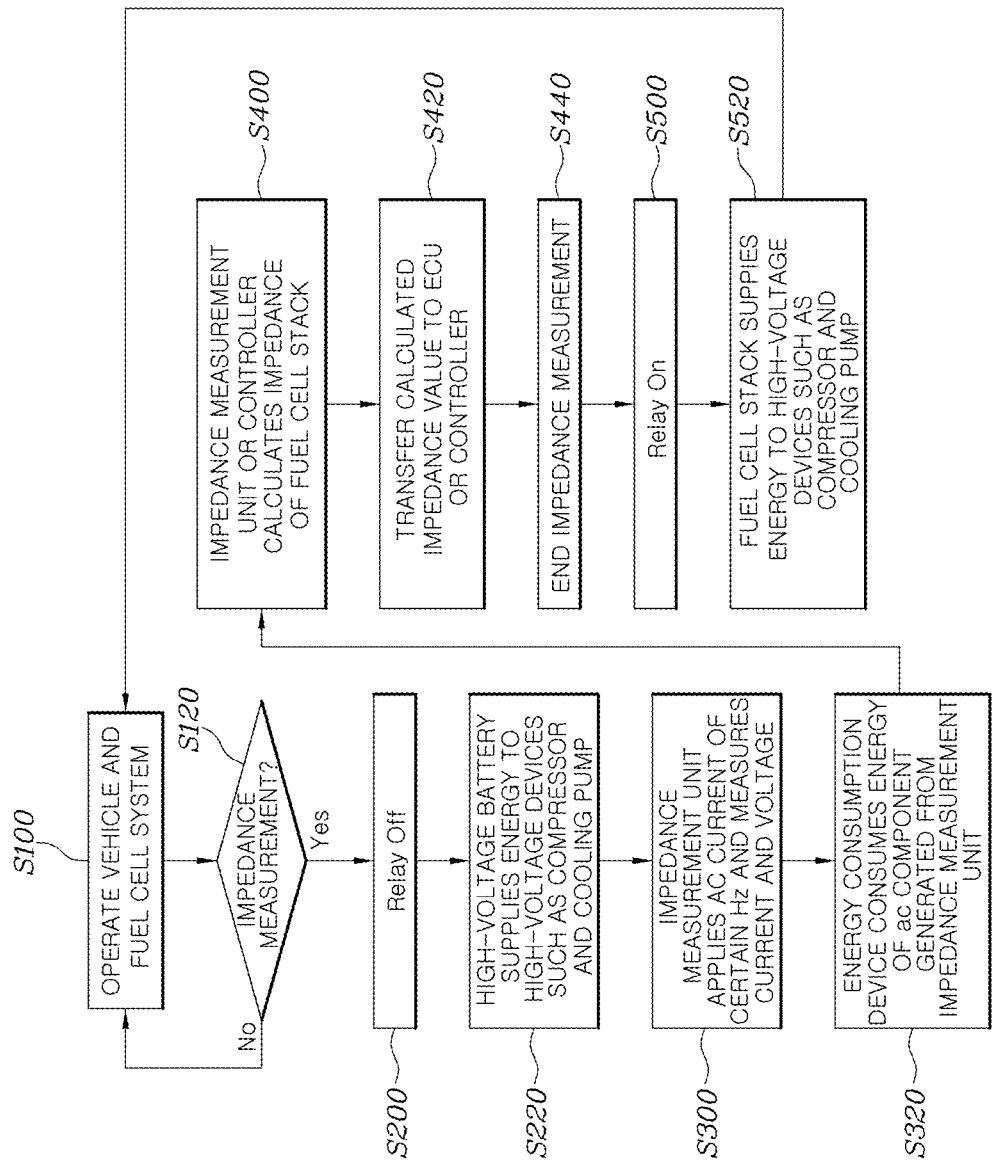
FIG. 4 is a flowchart of a method for measuring impedance of a fuel cell stack according to an embodiment of the present disclosure.

FIG. 1 is a diagram illustrating the configuration of a system for measuring impedance of a fuel cell stack according to an embodiment of the present disclosure. FIGS. 2 and 3 are diagrams illustrating a connection state of an impedance measurement unit of the system for measuring impedance of a fuel cell stack according to an embodiment of the present disclosure. FIG. 4 is a flowchart of a method for measuring impedance of a fuel cell stack according to an embodiment of the present disclosure.

FIG. 1 is a diagram illustrating the configuration of a system for measuring impedance of a fuel cell stack according to an embodiment of the present disclosure. A system for measuring impedance of a fuel cell stack according to the present disclosure includes: energy consumption devices 720 and 740, cooling devices 900, and a high-voltage battery 950 connected in parallel to a main bus end 120 of a fuel cell stack 100; a relay 300 provided at the main bus end 120 and configured to electrically connect or disconnect the cooling devices 900 and the high-voltage battery 950 to or from the fuel cell stack 100; an impedance measurement unit 500 configured to apply an AC current to the fuel cell stack 100 and to measure the impedance of the fuel cell stack 100; and a controller 1000 configured to turn off the relay 300 during measurement of the impedance of the fuel cell stack 100.

The system for measuring the impedance of the fuel cell stack according to the present disclosure is to grasp or identify the state of a fuel cell, such as the degree of deterioration in the fuel cell, by accurately measuring the impedance of all of the cells of the fuel cell stack 100, some of the cells of the fuel cell stack 100, or a single cell of the fuel cell stack 100.

In a fuel cell system, the main bus end 120 is connected to the fuel cell stack 100, and various kinds of devices are connected in parallel to the corresponding main bus end 120. As illustrated, the energy consumption devices 720 and 740, the cooling devices 900, and the high-voltage battery 950 are connected in parallel to the main bus end 120 of the fuel cell stack 100.

Further, at the main bus end 120, a main relay 140 is provided to connect or disconnect the fuel cell stack 100 to or from the whole system. Further, the relay 300 according to the present disclosure is additionally provided to electrically connect or disconnect the cooling devices 900 and the high-voltage battery 950 to or from the fuel cell stack 100.

In other words, according to the present disclosure, the additional relay 300 is provided separately from the main relay 140, and electrically connects or disconnects the cooling devices 900 and the high-voltage battery 950 in parallel to the main bus end 120 to or from the fuel cell stack 100. Accordingly, during the measurement of the impedance of the fuel cell stack 100, the relay 300 is turned off, and thus the cooling device 900 and the high-voltage battery 950 are electrically disconnected from the fuel cell stack 100. Accordingly, the cooling device 900 consumes the current of the high-voltage battery 950 rather than the current of the fuel cell stack 100, thus reducing noise occurring during the measurement of the impedance of the fuel cell stack 100.

Meanwhile, the impedance measurement unit 500 applies an AC current to the fuel cell stack 100 and measures the impedance of the fuel cell stack 100. According to the present disclosure, the impedance measurement unit 500 may be variously configured in the fuel cell system, and if needed, the impedance measurement unit 500 may be connected to the fuel cell system through a switch and the like or may be mounted from the outside to be connected to the fuel cell system.

Further, during the measurement of the impedance of the fuel cell stack 100, the controller 1000 turns off the relay 300 described above. Doing so separates and disconnects the cooling devices 900 and the high-voltage battery 950 from the main bus end 120 and reduces the noise occurrence during the measurement of the impedance of the fuel cell stack 100 through the impedance measurement unit 500. Further, by controlling the cooling devices 900, the controller 1000 separately cools the energy consumption devices 720 and 740 that are using the high-voltage battery 950.

Meanwhile, during the measurement of the impedance of the fuel cell stack 100, the energy consumption devices 720 and 740 may consume energy caused by the AC current component applied to the fuel cell stack 100. In other words, in order to measure the impedance of the fuel cell stack 100, it is necessary to apply an AC current to the fuel cell stack 100 that is driven by DC current, and to consume surplus energy. Accordingly, the energy is consumed through the separate energy consumption devices 720 and 740. In this case, it is necessary to cool heat generated by the energy consumption devices 720 and 740, and thus the cooling devices 900 are separately driven through the high-voltage battery 950.

In other words, during the measurement of the impedance of the fuel cell stack 100, the cooling devices 900 can cool the energy consumption devices 720 and 740. In this case, the cooling device 900 may be supplied with the energy from the high-voltage battery 950. In the present disclosure, by driving the cooling device 900 using the current being supplied from the high-voltage battery 950 rather than the fuel cell stack 100, the noise of the current can be removed during the measurement of the impedance of the fuel cell stack 100. By only applying the current necessary to measure the impedance of the fuel cell stack 100, only a very small amount of energy is consumed by the energy consumption devices 720 and 740.

Since the amount of cooling required for the energy consumption devices 720 and 740 is also reduced, it is not necessary to drive the cooling device 900 as a whole, and the energy consumption devices 720 and 740 can be cooled only with the minimum air cooling. Accordingly, the driving of the compressor and the like for a refrigerant is unnecessary or is reduced. Also, accordingly, the consumption of the high-voltage battery 950 is also reduced, thereby reducing the energy consumption of the whole system and implementing environmentally friendly energy consumption.

Of course, during a general operation instead of the measurement of the impedance of the fuel cell stack 100, the relay 300 is turned on, and the cooling device 900 is supplied with the energy from the fuel cell stack 100 and cools the fuel cell stack 100, or normally performs air conditioning or cooling in the necessary system.

FIGS. 2 and 3 are diagrams illustrating a connection state of the impedance measurement unit of the system for measuring impedance of a fuel cell stack according to an embodiment of the present disclosure.

As illustrated, the impedance measurement unit 500 may be provided with a current application line 520 and a voltage measurement line 540. Although not illustrated, in order to measure the total impedance of the fuel cell stack 100, the impedance measurement unit 500 may be configured so that the current application line is electrically connected to both ends of the fuel cell stack and the voltage measurement line is electrically connected to both the ends of the fuel cell stack. Through such connections, the current and the voltage flowing through the fuel cell stack are measured, and the total impedance is measured.

Meanwhile, in order to measure the impedance of a partial specific section, the impedance measurement unit may be configured so that the current application line is electrically connected to the both ends of the fuel cell stack and the voltage measurement line is electrically connected to the partial cell section of the fuel cell stack. Accordingly, it is also possible to calculate the impedance by measuring the current and the voltage flowing through the partial section.

Further, as shown in FIG. 2, the impedance measurement unit 500 may be configured so that the current application line 520 is electrically connected to a partial cell section A of the fuel cell stack 100 and the voltage measurement line 540 is electrically connected to the partial cell section A of the fuel cell stack at the same point. Alternatively, as shown in FIG. 3, the impedance measurement unit 500 may be configured so that the current application line 520 is electrically connected to the partial cell section A of the fuel cell stack and the voltage measurement line 540 is electrically connected to a cell section B having a narrower range than that of the current application line 520.

Through the above-described processes, it is possible to measure the impedance of the partial specific section rather than the whole section of the fuel cell stack. Further, it is also possible to independently measure the impedance of one cell. Therefore, it is possible to relatively accurately identify which cell of the fuel cell stack has greatly deteriorated.

Further, the controller 1000 may turn on the relay 300 and make the fuel cell stack 100 supply energy to the cooling device 900 after the measurement of the impedance of the fuel cell stack 100 has ended. The energy consumption devices 720 and 740 may be electronic equipment including a driving motor 720.

Further, the energy consumption devices 720 and 740 may be directly connected to the fuel cell stack 100 or the impedance measurement unit 500 separately from the main bus end 120. FIG. 1 shows both cases in which the motor 720 or cathode oxygen depletion (COD) resistor 740 is connected to the main bus end 120 as the energy consumption device, and a separate energy consumption device 700 is directly connected to the impedance measurement unit 500. Of course, unlike the cases illustrated, the energy consumption device may be composed of only the motor 720 or the COD resistor 740 or be directly connected to the impedance measurement unit. In the case that the energy consumption device 700 is directly connected to the impedance measurement unit, the COD 740 may be provided at the rear end of the relay 300 and may be disconnected when the relay 300 is turned off. Or, as illustrated in FIG. 1, a separate COD relay 742 may be provided to turn off the energy consumption device.

FIG. 4 is a flowchart of a method for measuring impedance of a fuel cell stack according to an embodiment of the present disclosure. The method for measuring impedance of a fuel cell stack using the measurement system according to the present disclosure includes: turning off a relay; applying, by an impedance measurement unit, an AC current to the fuel cell stack; measuring, by the impedance measurement unit, the impedance of the fuel cell stack; consuming, by an energy consumption device, energy by an AC current component applied to the fuel cell stack; and supplying, by a high-voltage battery, the energy to a cooling device and cooling, by the cooling device, the energy consumption device.

First, a vehicle and a fuel cell system are operated (S100). If the impedance measurement is needed, the relay is turned off (S120 and S200). Thereafter, the high-voltage battery supplies the energy to the cooling device (S220). Then, the impedance measurement unit applies the AC current to the fuel cell stack and measures the impedance of the fuel cell stack (S300).

Thereafter, the energy consumption device consumes the energy caused by the AC current component applied to the fuel cell stack (S320), the high-voltage battery supplies the energy to the cooling device, and the cooling device cools the energy consumption device.

The impedance is calculated, the calculated impedance is transferred, and then the measurement is ended (S400, 5420, and S440). After the measurement is ended, the relay is turned on again, and the fuel cell stack normally provides power to respective driving units (S500 and S520).

According to the system and the method for measuring the impedance of the fuel cell stack according to the present disclosure, noise occurring during the measurement of the impedance of the fuel cell can be minimized by supplying the energy from the battery, rather than the fuel cell, to the high-voltage energy consumption parts (e.g., a compressor, a cooling pump, and the like) that cause the noise, and the influence on the driving area of the fuel cell can be minimized since a small amount of energy is consumed. Further, the impedance of the whole fuel cell stack and the impedance of one or more cells in the certain locations can be measured, and the degree of freedom of design can be increased since not only is the existing water cooling applicable, but air cooling is also applicable due to the small amount of heat generation.

Although specific embodiments of the present disclosure have been illustrated and described for illustrative purposes, those having ordinary skill in the art should appreciate that various modifications, additions, and substitutions are possible, without departing from the scope and spirit of the disclosure as set forth in the accompanying claims.

What is claimed is:

1. A system for measuring impedance of a fuel cell stack, the system comprising:
    an energy consumption device, a cooling device, and a battery connected in parallel to a main bus end of a fuel cell stack;
    a relay provided at the main bus end and configured to electrically connect or disconnect the cooling device and the battery to or from the fuel cell stack;
    an impedance measurement unit configured to apply an AC current to the fuel cell stack and to measure the impedance of the fuel cell stack; and
    a controller configured to turn off the relay during measurement of the impedance of the fuel cell stack,
    wherein the impedance measurement unit is configured such that a current application line is electrically connected to a partial cell section of the fuel cell stack and a voltage measurement line is electrically connected to a cell section having a narrower range than a range of the current application line, and
    wherein the energy consumption device is directly connected to the fuel cell stack or the impedance measurement unit separately from the main bus end.

2. The system according to claim 1, wherein during the measurement of the impedance of the fuel cell stack, the energy consumption device consumes energy by an AC current component applied to the fuel cell stack.

3. The system according to claim 1, wherein during the measurement of the impedance of the fuel cell stack, the cooling device is provided with energy from the battery.

4. The system according to claim 1, wherein during a general operation of the fuel cell stack, the relay is turned on, and the cooling device is supplied with energy from the fuel cell stack and cools the fuel cell stack.

5. The system according to claim 1, wherein the impedance measurement unit is provided with a current application line and a voltage measurement line.

6. The system according to claim 1, wherein the impedance measurement unit is configured such that a current application line is electrically connected to both ends of the fuel cell stack and a voltage measurement line is electrically connected to a partial cell section of the fuel cell stack.

7. The system according to claim 1, wherein the impedance measurement unit is configured such that a current application line is electrically connected to a partial cell section of the fuel cell stack and a voltage measurement line is electrically connected to the partial cell section of the fuel cell stack.

8. The system according to claim 1, wherein the controller turns on the relay and makes the fuel cell stack supply energy to the cooling device after the measurement of the impedance of the fuel cell stack is ended.

9. The system according to claim 1, wherein the energy consumption device is electronic equipment including a driving motor.

10. A method for measuring impedance of a fuel cell stack using the measurement system of claim 1, the method comprising:
    turning off a relay;
    applying, by an impedance measurement unit, an AC current to the fuel cell stack;
    measuring, by the impedance measurement unit, the impedance of the fuel cell stack;
    consuming, by an energy consumption device, energy by an AC current component applied to the fuel cell stack; and
    supplying, by a battery, the energy to a cooling device and cooling, by the cooling device, the energy consumption device.

11. The system according to claim 1, wherein, during the measurement of the impedance of the fuel cell stack, the cooling device cools the energy consumption device.

* * * * *